(12) United States Patent
Sato et al.

(10) Patent No.: US 12,468,295 B2
(45) Date of Patent: Nov. 11, 2025

(54) ASSISTANCE METHOD, ASSISTANCE DEVICE, AND ASSISTANCE PROGRAM

(71) Applicant: CHIYODA CORPORATION, Yokohama (JP)

(72) Inventors: Hideki Sato, Yokohama (JP); Shizuka Ikawa, Yokohama (JP); Motoki Irikura, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 18/997,580

(22) PCT Filed: Aug. 5, 2022

(86) PCT No.: PCT/JP2022/030071
§ 371 (c)(1),
(2) Date: Jan. 22, 2025

(87) PCT Pub. No.: WO2024/029063
PCT Pub. Date: Feb. 8, 2024

(65) Prior Publication Data
US 2025/0258487 A1 Aug. 14, 2025

(51) Int. Cl.
*G05B 19/418* (2006.01)
*G06F 30/20* (2020.01)

(52) U.S. Cl.
CPC ....... *G05B 19/41885* (2013.01); *G06F 30/20* (2020.01)

(58) Field of Classification Search
CPC .................. G05B 19/41885; G06F 30/20
See application file for complete search history.

(56) References Cited

U.S. PATENT DOCUMENTS

| | | | |
|---|---|---|---|
| 2007/0067149 A1* | 3/2007 | Zufferey | G05B 17/02 703/12 |
| 2007/0208436 A1 | 9/2007 | Das et al. | |
| 2011/0061224 A1 | 3/2011 | Ludwig | |
| 2020/0379452 A1* | 12/2020 | Yamaguchi | G06Q 10/06 |
| 2022/0035346 A1 | 2/2022 | Mercangoez et al. | |
| 2024/0004356 A1* | 1/2024 | Zhao | G05B 13/048 |

FOREIGN PATENT DOCUMENTS

JP 2007087383 A 4/2007
JP 2019089907 A 6/2019

OTHER PUBLICATIONS

International Search Report issued on Oct. 25, 2022, in corresponding International Application No. PCT/JP2022/030071; 4 pages.
Decision to Grant a Patent issued on Feb. 21, 2023, in corresponding Japanese Application No. 2022-577219; 5 pages.
Extended Search Report issued on Jul. 24, 2025, in corresponding European Application No. 22954051.3, 9 pages.

* cited by examiner

*Primary Examiner* — Chuen-Meei Gan
(74) *Attorney, Agent, or Firm* — Maier & Maier, PLLC

(57) ABSTRACT

An assistance method comprising steps of: acquiring information related to a process or a reduced system when the process to be performed in a plant is performed in the reduced system with a smaller scale than the plant; and generating at least a part of a model for predicting a process to be performed in the plant, or an intermediate system with a scale between the plant and the reduced system, based on a relationship between systems when the process is performed in a plurality of systems of different scales, from the information.

10 Claims, 8 Drawing Sheets

FIG. 4

| | LAB-SCALE MODEL | BENCH-SCALE MODEL | COMMERCIAL-SCALE MODEL |
|---|---|---|---|
| EFFECT OF REACTION TIME | $\frac{dC_A}{dt} = -(k_{AB} + k_{AC})C_A$<br>$\frac{dC_B}{dt} = k_{AB}C_B$<br>$\frac{dC_C}{dt} = k_{AB}C_C$ | $\frac{dC_A}{dt} = -CA(k_{AB} + k_{AC})C_A$<br>$\frac{dC_B}{dt} = CAk_{AB}C_B$<br>$\frac{dC_C}{dt} = CAk_{AB}C_C$ | $\frac{dC_A}{dt} = -CA(k_{AB} + k_{AC})C_A$<br>$\frac{dC_B}{dt} = CAk_{AB}C_B$<br>$\frac{dC_C}{dt} = CAk_{AB}C_C$ |
| EFFECT OF REACTION TIME DISTRIBUTION | BATCH-TYPE | CSTR_5-STAGE TYPE | CSTR_10-STAGE TYPE |
| EFFECT OF REACTION TEMPERATURE | $k_{xx} = k'_{xx}\exp\left(-\frac{Ea}{RT}\right)$ | $k_{xx} = k'_{xx}\exp\left(-\frac{Ea}{RT}\right)$ | $k_{xx} = k'_{xx}\exp\left(-\frac{Ea}{RT}\right)$ |
| EFFECT OF REACTION PRESSURE | NO NEED TO CONSIDER DUE TO LIQUID-PHASE REACTION | NO NEED TO CONSIDER DUE TO LIQUID-PHASE REACTION | NO NEED TO CONSIDER DUE TO LIQUID-PHASE REACTION |
| EFFECT OF REACTION PRESSURE | NO NEED TO CONSIDER BECAUSE CATALYST IS USED FOR SHORT TIME. | $CA = CA_0\exp(-k_a t)$ | $CA = CA_0\exp(-k_a t)$ |
| EFFECT OF MATERIAL DIFFUSION | NO NEED TO CONSIDER BECAUSE IT IS COMPLETE MIXING LAYER | $k_{xx} = 4\pi a D_A$ | NO NEED TO CONSIDER IN MAIN OPERATION RANGE |

| LAB-SCALE MODEL | BENCH-SCALE MODEL | COMMERCIAL-SCALE MODEL |
|---|---|---|
| SEPARATING A PLURALITY OF BOILING POINT FRACTIONS IN SINGLE POT | USING A PLURALITY OF STAGES, TEMPERATURE AND PRESSURE ARE DIFFERENT AT EACH STAGE | USING A PLURALITY OF STAGES, TEMPERATURE AND PRESSURE ARE DIFFERENT AT EACH STAGE |
| (diagram: single pot with BOILING POINT FRACTION output; TEMPERATURE CHANGE REQUIRED) | (diagram: Feed into multi-stage vessel with BOILING POINT FRACTION outputs) | (diagram: Feed into multi-stage vessel with BOILING POINT FRACTION outputs) |
| CALCULATION OF CHEMICAL EQUILIBRIUM MODEL CHANGES ACCORDING TO INTERNAL TEMPERATURE (WHICH CHANGES OVER TIME) | CALCULATION FOR CHEMICAL EQUILIBRIUM MODEL EXISTS AT EACH STAGE | CALCULATION FOR CHEMICAL EQUILIBRIUM MODEL EXISTS AT EACH STAGE |

FIG. 5

ASSISTANCE METHOD, ASSISTANCE DEVICE, AND ASSISTANCE PROGRAM

TECHNICAL FIELD

The present invention relates to an assistance method, an assistance device, and an assistance program for assisting a design and an operation of a plant.

BACKGROUND ART

When constructing a large-scale plant, a design is performed in stages, starting with small scale, then medium scale, and finally large scale. First, a system for performing a process on a small scale is designed, and the process is performed in an assembled small-scale system. Based on information obtained at this time, a predictive model is constructed to predict the process in the small-scale system. This predictive model is used to consider an equipment configuration, an equipment size, an operation policy, etc. for a next-scale system, and the next-scale system is designed. This consideration is repeated in stages to finally design a commercial-scale plant.

CITATION LIST

Patent Literature

[Patent Literature 1] JP-A-2019-89907

SUMMARY OF INVENTION

Technical Problem

In order to perform this consideration, it is necessary to create predictive models at each scale and then tune the predictive models. This requires a lot of time and cost, which ultimately slows down a speed of development.

The present invention has been made in view of the above circumstances, and has an object to provide a technique for assisting a design of a plant.

Solution to Problem

In order to solve the above problem, an assistance method of one aspect of the present invention comprises steps of: acquiring information related to a process or a reduced system when the process to be performed in a plant is performed in the reduced system with a smaller scale than the plant; and generating at least a part of a model for predicting a process to be performed in the plant, or an intermediate system with a scale between the plant and the reduced system, based on a relationship between systems when the process is performed in a plurality of systems of different scales, from the information.

Another aspect of the present invention is an assistance device. This device comprises an information acquisition unit; and a model generation unit, wherein the information acquisition unit acquires information related to a process or a reduced system when the process to be performed in a plant is performed in the reduced system with a smaller scale than the plant, and the model generation unit generates a model for predicting a process to be performed in the plant, or an intermediate system with a scale between the plant and the reduced system, based on a relationship between systems when the process is performed in a plurality of systems of different scales, from the information.

Another aspect of the present invention is an assistance device. This device comprises an operation assistance unit, wherein the operation assistance unit assists a control of a plant during operation based on a model for predicting a process to be performed in the plant, and the model is generated from information related to the process or a reduced system when the process is performed in the reduced system with a smaller scale than the plant, based on a relationship between systems when the process to be performed in the plant is performed in a plurality of systems of different scales.

In addition, any combination of the above components, and any conversion of the expression of the present invention into method, device, system, recording media, computer program, etc., are also valid as aspects of the present invention.

According to the present invention, a technique for assisting a design and an operation of a plant can be provided.

BRIEF DESCRIPTION OF DRAWINGS

FIG. 4 is a diagram showing a specific example of an assistance method according to the present embodiment.

FIG. 5 is a diagram showing another specific example of an assistance method according to the present embodiment.

DESCRIPTION OF EMBODIMENTS

Figure 1:
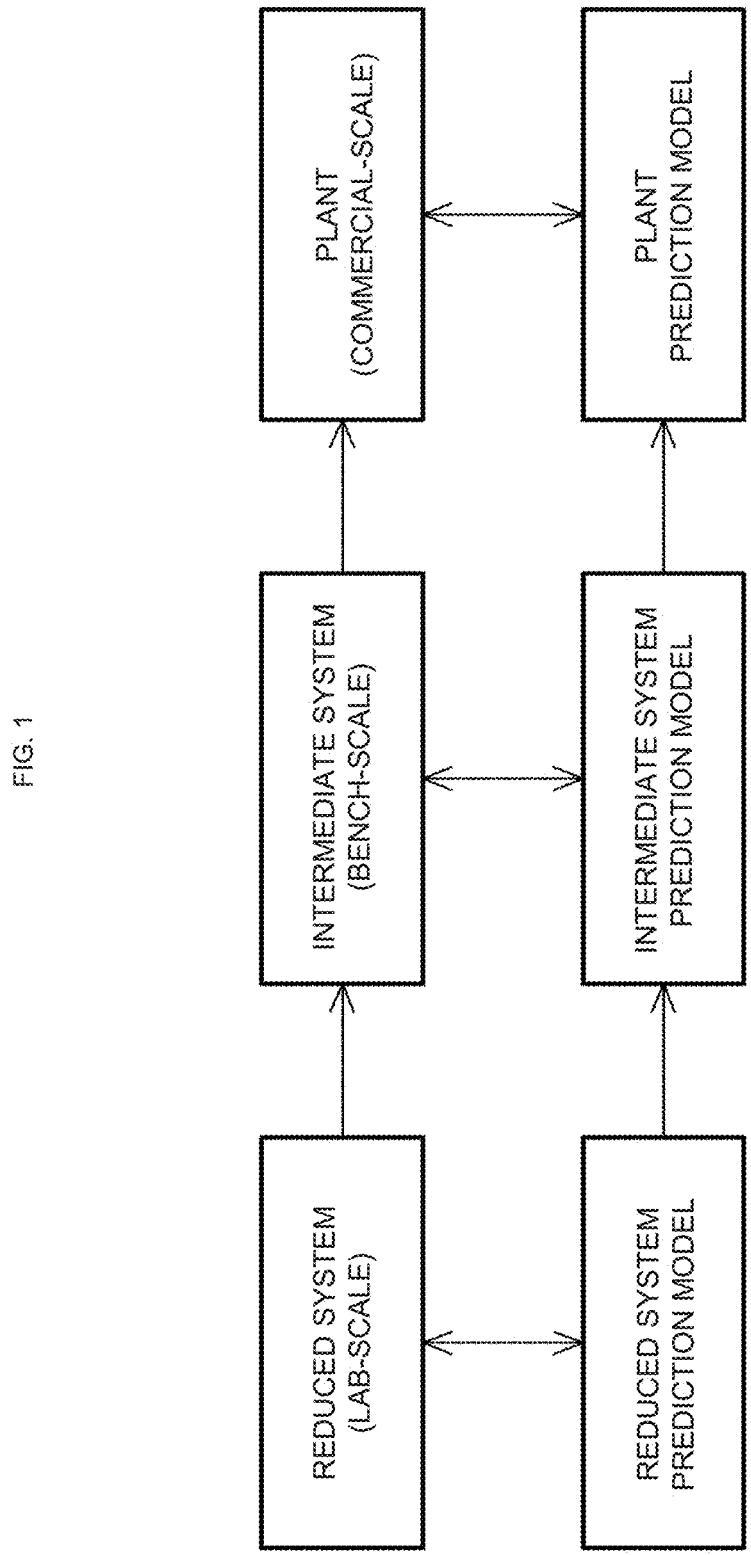
FIG. 1 is a diagram showing a schematic diagram of a process for designing a plant.

FIG. 1 shows a schematic diagram of a process for designing a plant. The plant comprises a plurality of devices and equipment, etc. to perform a process of manufacturing products by processing raw materials (reaction, separation, drying, processing, etc.). When designing a commercial-scale plant, as described above, the design is performed by gradually scaling up a system smaller than the plant. In the example shown in this figure, the design is performed by scaling up in the order of a lab-scale (laboratory-scale) reduced system, a bench-scale intermediate system, and a commercial-scale plant. It is noted that only one system may be considered as a system smaller than the plant, or three or more systems of different scales may be considered. In the latter case, for example, a pilot-scale (prototype-scale) intermediate system may be considered between the bench-scale intermediate system and the commercial-scale plant.

For example, in plants that handle chemical substances such as petroleum, petrochemical, chemical, and synthetic pharmaceutical plants, the lab-scale reduced system is mainly configured by batch-type reactors, etc. The bench-scale intermediate system is mainly configured by a plug flow reactor (PFR) and a continuous stirred-tank reactor (CSTR), etc. The commercial-scale plant is mainly configured by the plug flow reactor and the continuous stirred-tank reactor, etc. that are larger in scale or have a plurality of stages than the bench-scale intermediate system. Chemical processes performed in such plants include processes that manufacture, for example, industrial chemicals, chemical fertilizers, paper, pulp, rubber, synthetic fibers, synthetic resins, petroleum products, pharmaceuticals, dyes, detergents, cosmetics, and bioproducts, etc. through chemical processing.

Using a prediction model for predicting a process in a system of each scale, a configuration of a device, a size of the device, an operation policy, etc. of the next-scale system are considered and the next-scale system is designed. The prediction model may be a chemical, physical, or numerical simulation of the process, or a mathematical formula for calculating various state quantities and control quantities, etc. in the process. In the case of a plant that handles chemical substances, the prediction model may be a model based on knowledge of chemical engineering or physical chemistry, such as a chemical reaction model or a chemical equilibrium model. The prediction model may be artificial intelligence, etc. that inputs parameters representing the operation condition of the system and outputs simulation results and values of various state quantities and control quantities.

The main body that designs the plant accumulates data on scale-up for various types of plant through the design and operation of many plants. This disclosure proposes an assistance method for assisting a design and an operation of a plant by using such data.

Figure 2:
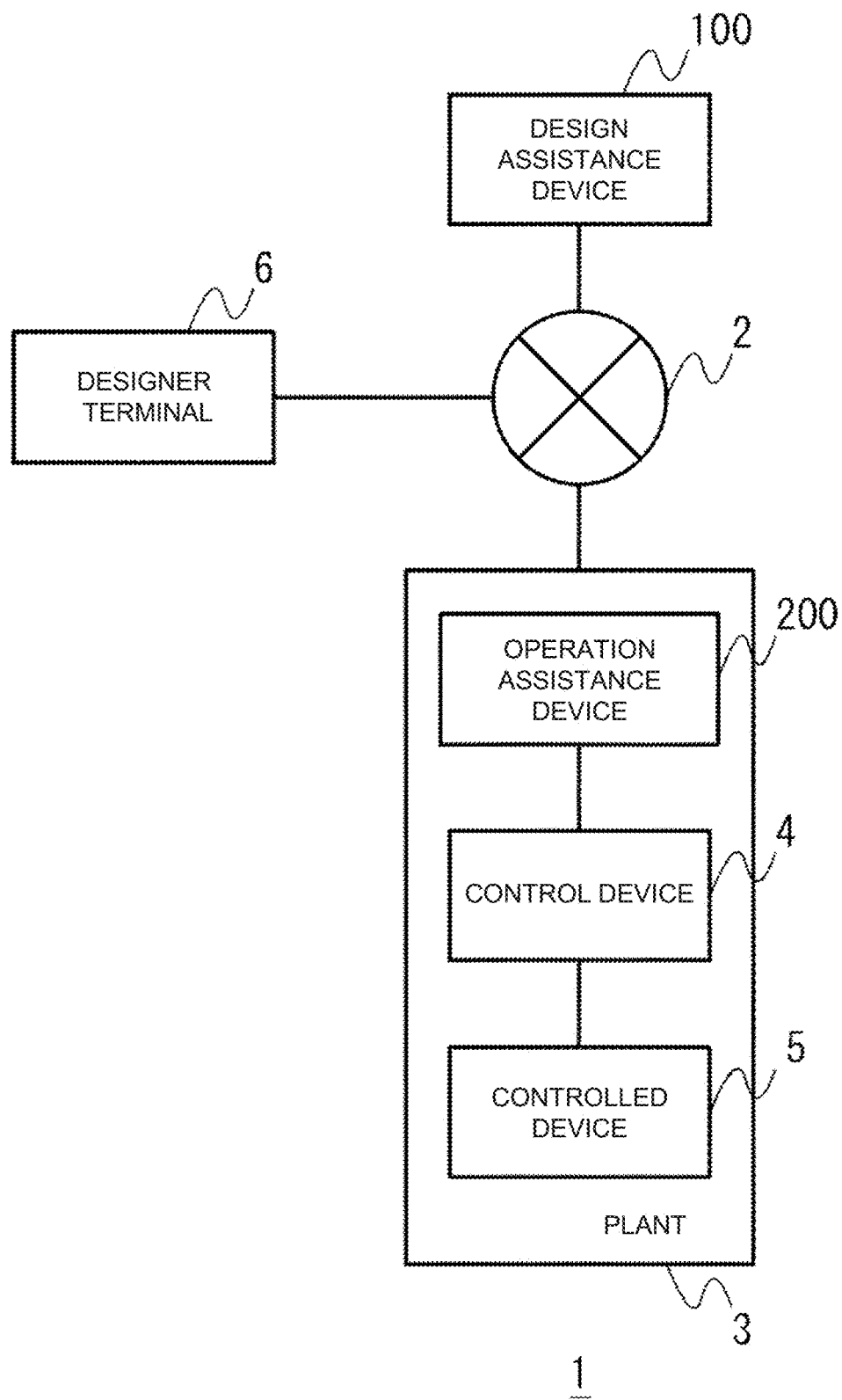
FIG. 2 is a diagram showing a configuration of an assistance system according to an embodiment.

FIG. 2 shows the configuration of an assistance system according to an embodiment. The assistance system 1 includes a plant 3, a design assistance device 100 that assists a design of the plant 3, and a designer terminal 6 used by a designer who designs the plant 3. The design assistance device 100, the designer terminal 6, and the plant 3 are connected by an arbitrary communication network 2 such as the Internet or an in-house connection system, and are operated in an arbitrary operation form such as on-premise, cloud, or edge computing.

The plant 3 includes a controlled device 5 that performs a process, a control device 4 that sets a control amount for controlling an operation condition of the controlled device 5, and an operation assistance device 200 that assists an operation of the plant 3 using a prediction model learned by the design assistance device 100.

Figure 3:
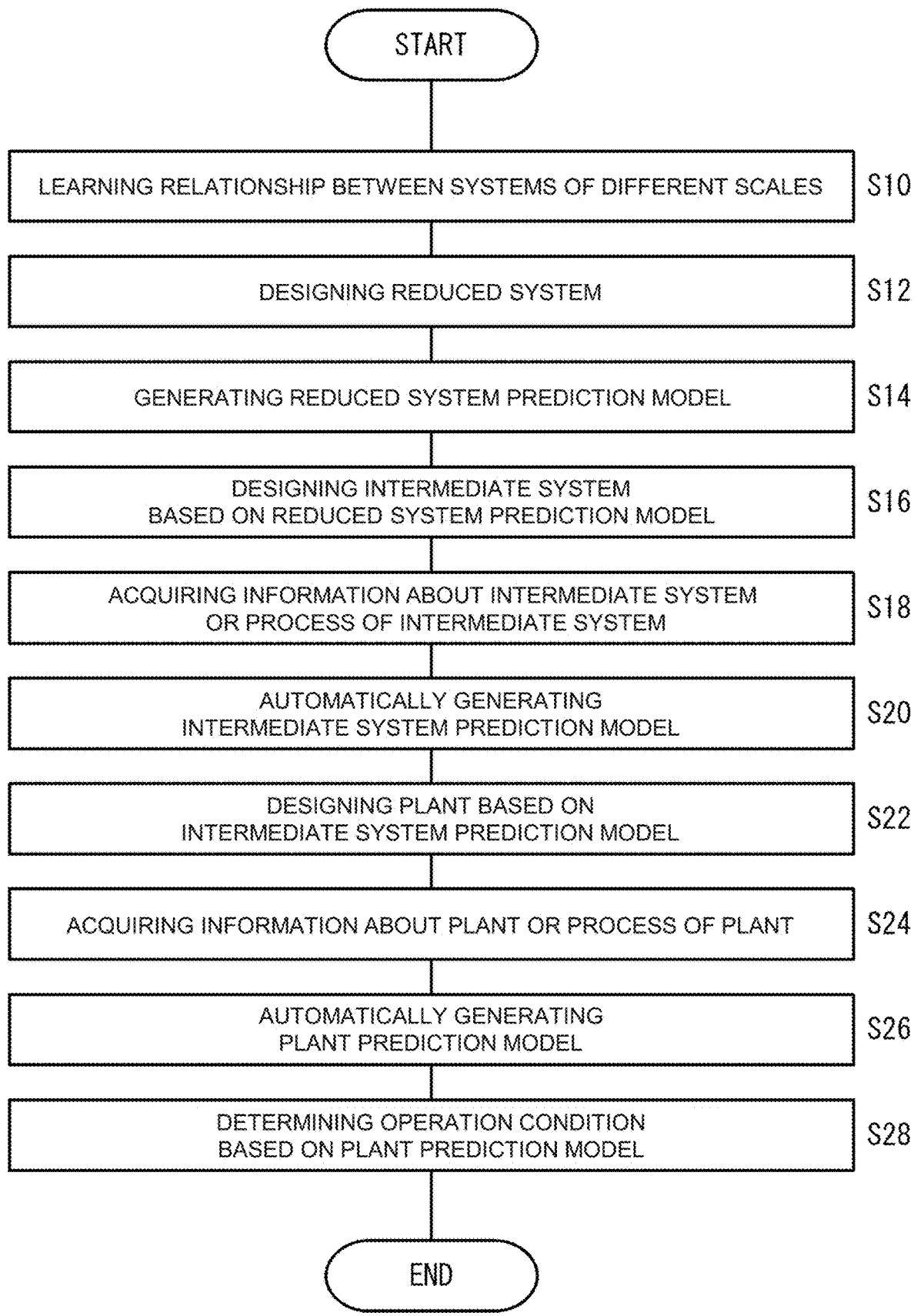
FIG. 3 is a flowchart showing a procedure of an assistance method according to an embodiment of the present invention.

FIG. 3 is a flow chart showing the procedure of the assistance method according to the embodiment of the present invention FIG. 3 shows the procedure of the assistance method for assisting the design of the plant.

The design assistance device 100 that assists the design of the plant 3 learns a relationship between systems of different scales based on data on scale-up performed when the plant was designed in the past (S10). The design assistance device 100 learns the relationship between the systems based on information related to a plurality of systems of different scales, information of the processes when the processes are performed in the plurality of systems, or information of a model for predicting the processes performed in the plurality of systems. For example, the design assistance device 100 learns how a reaction rate coefficient of a reaction performed in a reactor and a parameter of the prediction model for simulating the reaction, etc. change when the size of the reactor is scaled up, based on the performances of past cases. The information related to the system is, for example, the number, type, and size of the devices and equipment that make up the system, etc. The information of the process is, for example, the type, number, and time of the processing that make up the process, whether it is a batch process or a continuous process, the type, amount, and physical properties of the raw materials, the type, amount, and characteristics of the catalyst, the temperature, pressure, and processing volume where the process is performed, etc. The information of the prediction model is, for example, the type of the prediction model, the type of the input data, the type of the output data, and the internal parameter, etc.

The design assistance device 100 assists the design of the reduced system (S12). The design assistance device 100 may present the configuration of the reduced system, etc., to the designer terminal 6 based on performance data from when a plant that performs a process similar to the process performed in the plant to be designed was designed.

The design assistance device 100 assists the generation of the reduced system prediction model (S14). The design assistance device 100 may automatically generate at least a part of the reduced system prediction model based on performance data of past cases similar to the reduced system or the process performed in the reduced system. The design assistance device 100 determines the model type in the reduced system prediction model, identifies reaction paths included in the process, calculates reaction rates, and generally determines the optimal reaction time based on data when the process is performed in the reduced system.

The design assistance device 100 assists the design of the intermediate system based on the reduced system prediction model (S16). The design assistance device 100 may present to the designer terminal 6 the type, number, size, etc. of the devices and equipment that make up the intermediate system based on the reduced system prediction model.

The design assistance device 100 acquires information related to the intermediate system designed in step S16 and information related to the process performed in the intermediate system (S18).

The design assistance device 100 generates at least a part of the intermediate system prediction model from the information acquired in step S18 based on the relationship between the systems learned in step S10 (S20). The design assistance device 100 applies the relationship between the systems learned based on cases similar to the reduced system or the process performed in the reduced system to the lab-scale reduced system prediction model to automatically generate a bench-scale intermediate system prediction model.

The design assistance device 100 assists the design of the plant 3 based on the intermediate system prediction model (S22). The design assistance device 100 may present the type, number, size, etc. of the devices and equipment that make up the plant 3 to the designer terminal 6 based on the intermediate system prediction model. The design assistance device 100 tunes the reaction rate in the process and models catalyst deterioration based on the intermediate system prediction model.

The design assistance device 100 acquires information related to the plant 3 designed in step S22 and information related to the process to be performed in the plant 3 (S24).

The design assistance device 100 generates at least a part of the plant prediction model from the information acquired in step S24 based on the relationship between the systems learned in step S10 (S26). The design assistance device 100 applies the relationship between the systems learned based on cases similar to the intermediate system or the process to be performed in the intermediate system to the bench-scale intermediate system prediction model to automatically generate a commercial-scale plant prediction model.

The design assistance device 100 determines the operation condition of the plant 3 based on the plant prediction model (S28). The design assistance device 100 inputs various operation conditions into the plant prediction model and searches for the operation condition that give the optimal operation point. The optimal operation point may be, for example, the operation condition where the product yield is maximized.

In this way, according to the assistance method of this embodiment, at least a part of the predictive model can be automatically generated, so that an ideal plant can be designed regardless of the ability of the designer, etc. In addition, the time, effort, cost, etc. required to design a plant can be reduced. In addition, the optimal operation condition for the plant can be determined.

FIG. 4 shows a specific example of the assistance method according to an embodiment. The plant of this specific example performs a process to produce substances B and C by adding a catalyst to a substance A that is a raw material and reacting it at the high temperature. For example, the substance A is a fraction with a boiling point range of 340 to 540° C., the substance B is a fraction with a boiling point range of 540° C. or higher, and the substance C is a fraction with a boiling point range of 340° C. or lower.

The lab-scale reduced system is configured by a batch-type reactor. In the reduced system prediction model, the effect of reaction time is taken into account using three equations that represent the time change in concentration of substances A, B, and C, respectively.

The bench-scale intermediate system is configured by a reactor where there is a reaction time distribution equivalent to a 5-stages CSTR-type in the prediction model. In the intermediate system prediction model, the time change in concentration of substances A, B, and C is expressed by an equation that differs from the reduced system prediction model due to differences in reactors. In a CSTR, residence time is also taken into account in the reaction time. In a system where there is a distribution in reaction time, the average reaction time $t_r(s)$ is expressed as $t_r=V/v$, where $V(m^3)$ is the reactor volume and $v(m^3/s)$ is the volumetric flow rate of the reactor.

The commercial-scale plant is configured by a reactor where there is a reaction time distribution equivalent to a 10-stages CSTR-type in the prediction model. In the plant prediction model, the time change in the concentrations of substances A, B, and C is expressed by an equation of the same form as the intermediate system.

In the reduced system, the batch process is performed, so the operation time is at most the time for one reaction. Therefore, the degree of catalyst deterioration is not significant and does not need to be taken into account in the model. However, in the intermediate system, the continuous process is performed, so the operation time is on the scale of several days to several years, and the effect of catalyst activity deterioration cannot be ignored. Therefore, in the intermediate system prediction model, the effect of catalyst activity is taken into account using an equation that represents the time change in catalyst activity.

Furthermore, in the reduced system, the inside of the reactor is sufficiently stirred, so diffusion of materials is not a rate-limiting factor and does not need to be taken into account in the model. However, in the intermediate system, diffusion of materials can become a rate-limiting factor when the flow rate is low, so the effects of diffusion of materials cannot be ignored. Therefore, the effects of diffusion of materials are also modeled in the intermediate system prediction model.

FIG. 5 shows another specific example of the assistance method according to the embodiment. The plant of this specific example performs a process of separating a raw material containing a mixture of a plurality of fractions by distillation.

The lab-scale reduced system is configured by a single distillation tower for separating a plurality of boiling point fractions. In the reduced system, the temperature inside the distillation tower increases as the low boiling point fractions are separated. Therefore, the reduced system prediction model includes a chemical equilibrium model that changes according to the time change in the internal temperature.

The bench-scale intermediate system is configured by a distillation tower with a plurality of stages with different temperatures and pressures. In the intermediate system, each boiling point fraction is separated at each stage. Therefore, the intermediate system prediction model includes a chemical equilibrium model for each stage.

The commercial-scale plant is also configured by a distillation tower with a plurality of stages with different temperatures and pressures. The plant prediction model also includes a chemical equilibrium model for each stage.

As such, there are various differences between a plurality of systems due to differences in scale, and therefore systematic differences between the predictive models of a plurality of systems. By learning these relationships, it is possible to automatically generate predictive models.

The design assistance device 100 may learn an AI (artificial intelligence) that automatically generates a predictive model through machine learning. This automatic generation AI may be a neural network that inputs information related to the smaller-scale system, information of a process when a process is performed in the smaller-scale system, information of a predictive model for predicting a process to be performed in the smaller-scale system, information related to the larger-scale system, information of a process when a process is performed in the larger-scale system, information related to the differences between the smaller-scale system and the larger-scale system, etc., and outputs information of a predictive model for predicting a process to be performed in the larger-scale system.

In the reaction system shown in FIG. 4, the automatic generation AI that automatically generates the intermediate system prediction model may input process information and information related to the differences in the systems, and output information of the intermediate system prediction model. For example, the automatic generation AI may input information such as the physical properties of the processed material, the physical properties of the product, the type of reaction, the processing amount, temperature, and pressure as process information, and input information such as whether the reduced system process is a continuous process or not, whether the intermediate system process is a continuous process or not, the processing amount of the reduced system process, and the processing amount of the intermediate system process as information related to the differences in the systems, and output information such as the model type (PFR, CSTR, etc.), model structure (presence or absence of catalytic activity term, presence or absence of mass transfer equation, etc.), and model coefficients (reaction rate coefficients, etc.) as information of the intermediate system prediction model. The intermediate system prediction model may include a plurality of models.

In the reaction system shown in FIG. 4, the automatic generation AI that automatically generates the intermediate system prediction model may input information related to the system and information related to the differences between the systems, and output information of the intermediate system prediction model. For example, the automatic generation AI may input information such as model type (PFR, CSTR, etc.), number of model reaction paths, and model coefficients (reaction rate constants, etc.) as information related to the system, and input information such as whether the reduced system process is a continuous process or not, whether the intermediate system process is a continuous process or not, the processing amount of the reduced system process, and the processing amount of the intermediate system process as information related to the differences between the systems, and output information such as model type (PFR, CSTR, etc.), model structure (presence or absence of catalytic activity terms, presence or absence of mass transfer equation, etc.), and model coefficients (reaction rate coefficients, etc.) as information of the intermediate system prediction model. The intermediate system prediction model may include a plurality of models.

In the reaction system shown in FIG. 4, the automatic generation AI that automatically generates the intermediate system prediction model may input information of the process, information related to the system, and information related to the differences between the systems, and output information of the intermediate system prediction model. For example, the automatic generation AI may input information such as the physical properties of the processed material, the physical properties of the product, the type of reaction, the processing amount, temperature, and pressure as the information of the process, input information such as the model type (PFR, CSTR, etc.), the number of model reaction paths, and model coefficients (reaction rate constants, etc.) as the information related to the system, input information such as whether the reduced system process is a continuous process or not, whether the intermediate system process is a continuous process or not, the processing amount of the reduced system process, and the processing amount of the intermediate system process as the information related to the differences between the systems, and output information such as the model type (PFR, CSTR, etc.), model structure (presence or absence of catalytic activity terms, presence or absence of mass transfer equation, etc.), and model coefficients (reaction rate coefficients, etc.) as the information of the intermediate system prediction model. The intermediate system prediction model may include a plurality of models.

In the distillation system shown in FIG. 5, the automatic generation AI that automatically generates the intermediate system prediction model may input information of the process, information related to the system, and information related to the differences between the systems, and output information of the intermediate system prediction model. For example, the automatic generation AI may input information such as the physical properties of the processed material, the processing amount, temperature, pressure, and processing time (in the case of a batch process) as the information of the process, input information such as model coefficients (equilibrium constants, etc.) and the number of theoretical stages of the distillation tower (in the case of a continuous process) as the information related to the system, input information such as whether the reduced system process is a continuous process or not, whether the intermediate system process is a continuous process or not, the processing amount of the reduced system process, and the processing amount of the intermediate system process as the information related to the differences between the systems, and output information such as model coefficients (equilibrium constants, etc.) and the number of theoretical stages of the distillation tower (in the case of a continuous process) as the information of the intermediate system prediction model. The intermediate system prediction model may include a plurality of models.

A specific example of automatically generating the intermediate system prediction model for the reaction system shown in FIG. 4 is shown below. The lab-scale system information includes the reactor volume and that it is a batch process (tank reactor), the bench-scale system information includes the reactor volume and that it is a continuous process (CSTR reactor), the lab-scale process information includes the amounts of substances B and C produced per unit time and the amount of catalyst D at the lab-scale, the lab-scale reduced system prediction model information includes the reaction time model shown in FIG. 4, and these information are input to the automatic generation AI. The automatic generation AI outputs the bench-scale reaction time model, reaction temperature model, reaction pressure model, and material diffusion model shown in FIG. 4 as the intermediate system prediction model.

Figure 6:
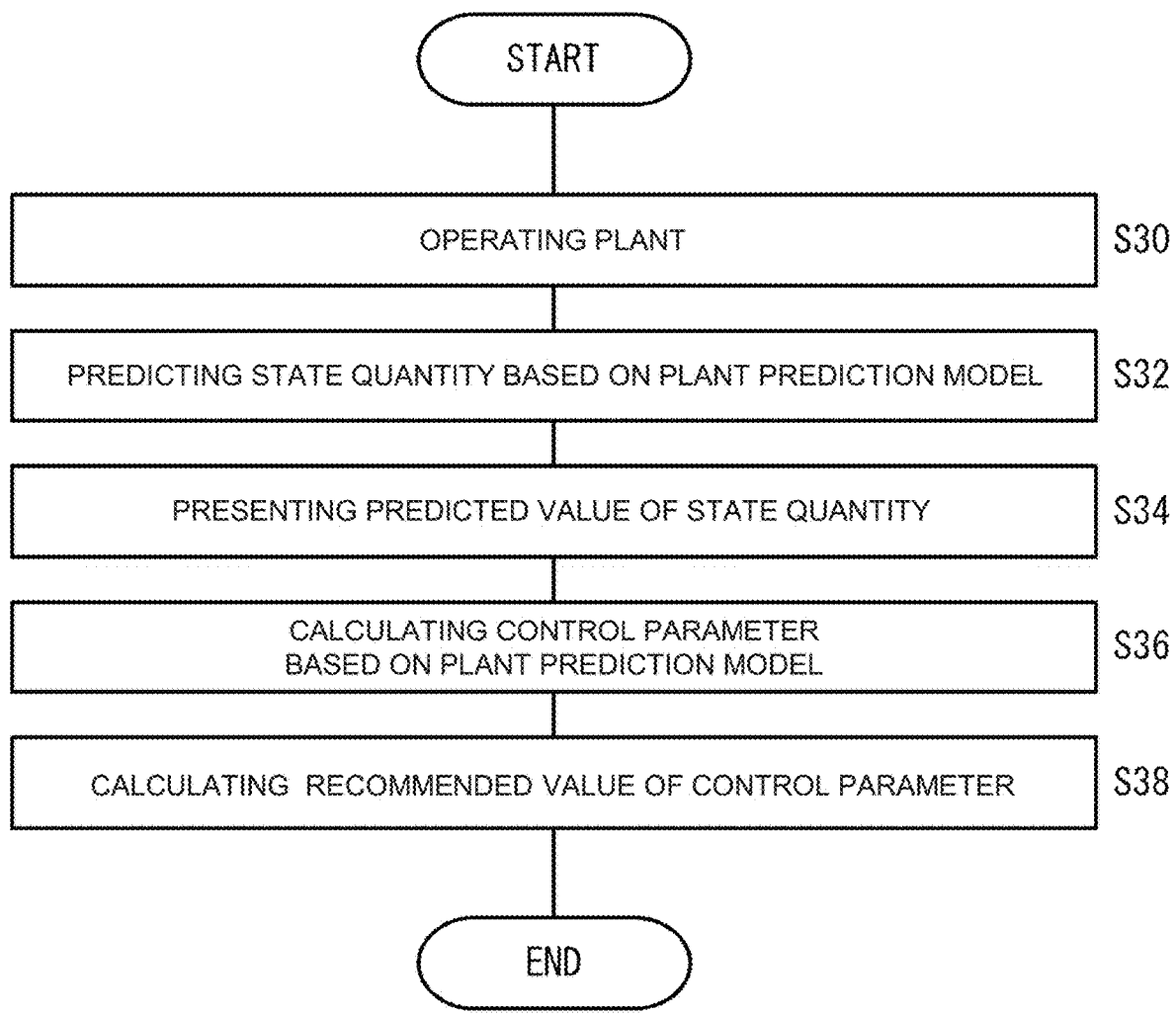
FIG. 6 is a flowchart showing a procedure of an assistance method according to an embodiment of the present invention.

FIG. 6 is a flowchart showing the procedure of the assistance method according to an embodiment of the present invention. FIG. 6 shows the procedure of the assistance method for assisting the control of the plant during operation.

When the plant is operated (S30), the operation assistance device 200 predicts the state quantity representing the state of the plant based on the plant prediction model (S32). The plant prediction model can be used as a soft sensor because it can simulate processes performed in the plant and calculate the state quantity of the plant. The design assistance device 100 may predict state quantities representing the past, present, or future states of the plant.

The operation assistance device 200 presents to the operator the predicted value of the state quantity predicted in step S32 (S34). This allows the operator to control the operation of the plant 3 while accurately grasping the state of the plant.

The operation assistance device 200 calculates the control parameter for controlling the plant based on the plant prediction model (S36). The design assistance device 100 calculates the recommended value of the control quantity by inputting the value of the current state quantity and the value of the changed control quantity into the plant prediction model and predicting value of the future state quantity.

The operation assistance device 200 presents the recommended value of the control quantity calculated in step S36 to the operator (S38). This allows the operator to accurately perform control for stable and efficient operation of the plant.

Figure 7:
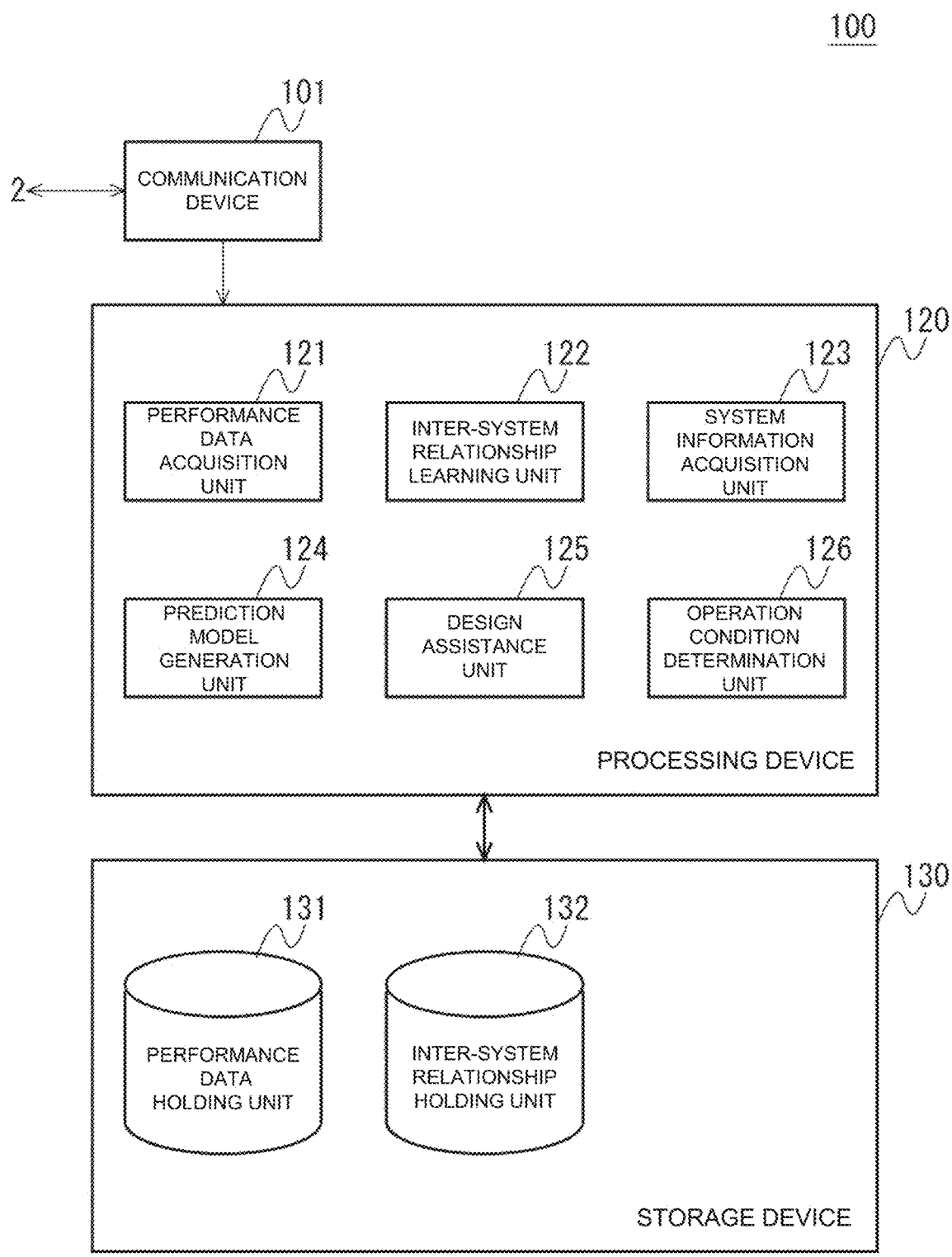
FIG. 7 is a diagram showing a configuration of a design assistance device according to the present embodiment.

FIG. 7 shows the configuration of a design assistance device 100 according to an embodiment. The design assistance device 100 includes a communication device 101, a processing device 120, and a storage device 130.

The communication device 101 controls wireless or wired communication. The communication device 101 transmits and receives data to and from the designer terminal 6, etc. via the communication network 2.

The storage device 130 stores data and computer programs used by the processing device 120. The storage device 130 includes a performance data holding unit 131 and an inter-system relationship holding unit 132.

The performance data holding unit 131 holds performance data generated when the plant was designed. The performance data may be, for example, the type, number, and size of the devices and equipment that make up the system at each scale, the type, content, and characteristics of the process at each scale, the type and parameters of the prediction model at each scale, etc.

The inter-system relationship holding unit 132 holds information indicating the relationship between systems of different scales.

The processing device 120 includes a performance data acquisition unit 121, an inter-system relationship learning unit 122, a system information acquisition unit 123, a prediction model generation unit 124, a design assistance unit 125, and an operation condition determination unit 126. In terms of hardware components, these configurations can be realized by any circuit, a computer CPU, memory, programs loaded into memory, etc., but here functional blocks realized by their cooperation are depicted. Therefore, it will be understood by those skilled in the art that these functional blocks can be realized in various forms using only hardware, only software, or a combination of both.

The performance data acquisition unit 121 acquires performance data that was generated when the plant was designed, and stores the data in the performance data holding unit 131.

The inter-system relationship learning unit 122 learns the relationship between systems of different scales based on the performance data held by the performance data holding unit 131, and stores information on the learned inter-system relationship in the inter-system relationship holding unit 132.

The system information acquisition unit 123 acquires information related to the process or the reduced system when a process to be performed in the plant 3 is performed in the reduced system smaller in scale than the plant 3.

The prediction model generation unit 124 automatically generates at least a part of the prediction model for predicting the process to be performed at the next scale from the information acquired by the system information acquisition unit 123 based on the inter-system relationship stored in the inter-system relationship holding unit 132.

The design assistance unit 125 assists the design of the next-scale system based on the prediction model.

The operation condition determination unit 126 determines the operation condition of the plant 3 based on the prediction model.

Figure 8:
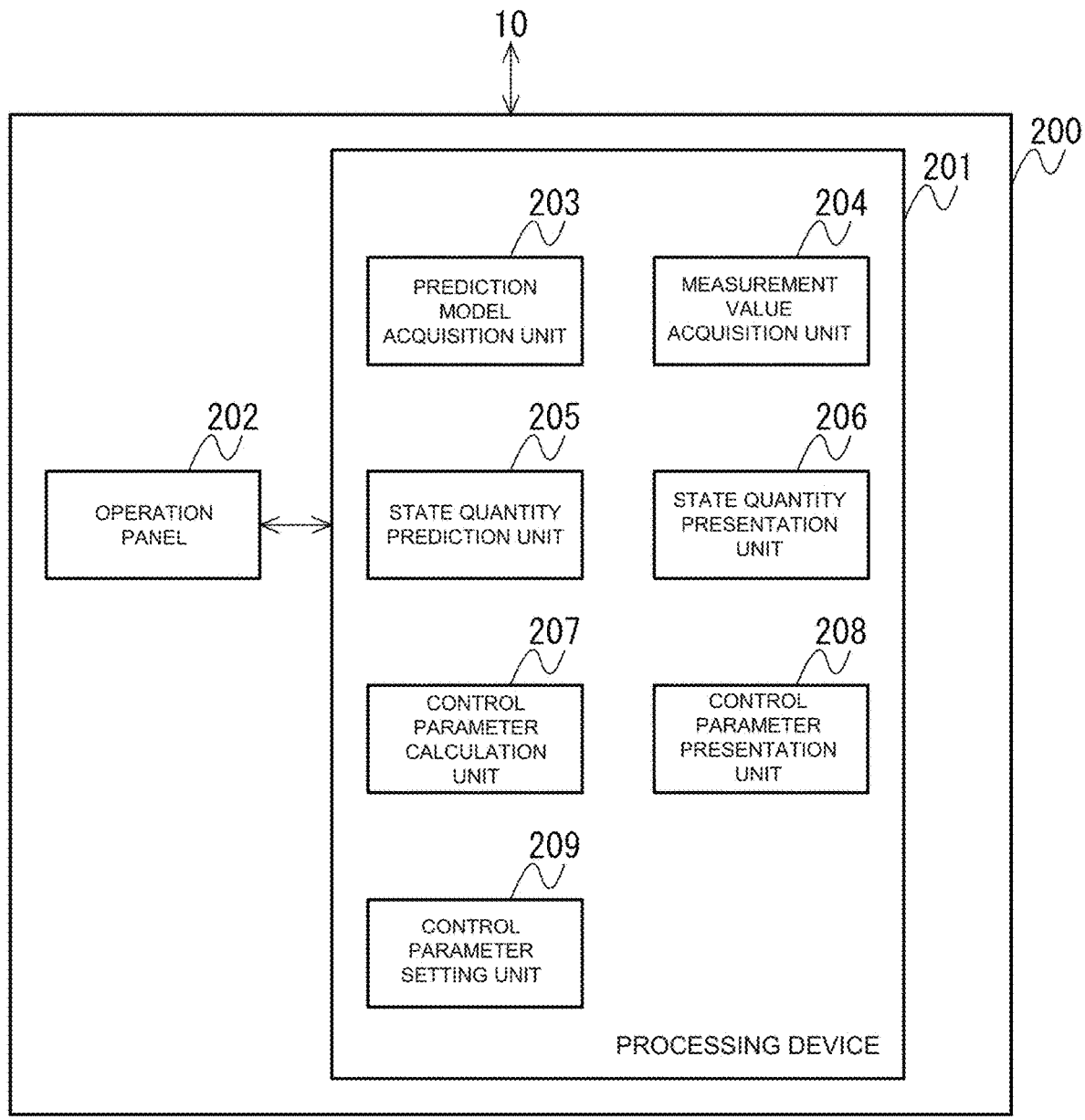
FIG. 8 is a diagram showing a configuration of an operation assistance device according to the present embodiment.

FIG. 8 shows a configuration of an operation assistance device 200 according to an embodiment. The operation assistance device 200 includes a processing device 201 and an operation panel 202.

The operation panel 202 displays on a display device a plurality of measurement values showing the states of a plurality of controlled devices 5 that configure the plant 3, the setting value of control operation quantity set in the controlled devices 5 by the control device 4, and the value of control parameter set in the control device 4, etc., and also accepts input of the value of control parameter, etc. from the operator.

The processing device 201 includes a prediction model acquisition unit 203, a measurement value acquisition unit 204, a state quantity prediction unit 205, a state quantity presentation unit 206, a control parameter calculation unit 207, a control parameter presentation unit 208, and a control parameter setting unit 209. In terms of hardware components, these configurations can be realized by any circuit, a computer CPU, memory, programs loaded into memory, etc., but here functional blocks realized by their cooperation are depicted. Therefore, it will be understood by those skilled in the art that these functional blocks can be realized in various forms using only hardware, only software, or a combination of both.

The prediction model acquisition unit 203 acquires the prediction model of the plant 3 from the design assistance device 100.

The measurement value acquisition unit 204 acquires measurement values showing the state of the controlled device 5 from various sensors, etc. provided in the plant 3.

The state quantity prediction unit 205 predicts the state quantity representing the state of the plant 3 based on the prediction model acquired by the prediction model acquisition unit 203.

The state quantity presentation unit 206 presents the predicted value of the state quantity predicted by the state quantity prediction unit 205 on the operation panel 202.

The control parameter calculation unit 207 calculates the recommended value of the control parameter to be set in the control device 4 based on the prediction model acquired by the prediction model acquisition unit 203.

The control parameter presentation unit 208 presents the recommended value of the control parameter calculated by the control parameter calculation unit 207 on the operation panel 202.

The control parameter setting unit 209 sets the setting value of the control parameter input by the operator via the operation panel 202 in the control device 4.

The present invention has been described above based on the embodiments. The embodiments are merely illustrative, and it will be understood by those skilled in the art that various modifications are possible in the combination of each of the components and each of the processing processes, and that such modifications are also within the scope of the present invention.

REFERENCE SIGNS LIST

1: assistance system, 2: communication network, 3: plant, 4: control device, 5: controlled device, 6: designer terminal, 100: design assistance device, 101: communication device, 120: processing device, 121: performance data acquisition unit, 122: inter-system relationship learning unit, 123: system information acquisition unit, 124: prediction model generation unit, 125: design assistance unit, 126: operation condition determination unit, 130: storage device, 131: performance data holding unit, 132: inter-system relationship holding unit, 200: operation assistance device, 201: processing device, 202: operation panel, 203: prediction model acquisition unit, 204: measurement value acquisition unit, 205: state quantity prediction unit, 206: state quantity presentation unit, 207: control parameter calculation unit, 208: control parameter presentation unit, 209: control parameter setting unit

INDUSTRIAL APPLICABILITY

The present invention can be used in an assistance devices for assisting a design of a plant.

The invention claimed is:
1. An assistance method comprising steps of:
acquiring information related to a process or a reduced system when the process to be performed in a plant is performed in the reduced system with a smaller scale than the plant;
automatically generating at least a part of a model for predicting a process to be performed in the plant, or an intermediate system with a scale between the plant and the reduced system, based on a relationship between systems when the process is performed in a plurality of systems of different scales, from the information using an AI (artificial intelligence), wherein the AI learns a relationship between systems based on (i) information related to a plurality of systems of different scales, (ii) information of a process when the process is performed in the reduced system or information of the model for predicting a process to be performed in the reduced system, and (iii) information of the model for predicting the process to be performed in the plant or the intermediate system; and determining an operation condition of the plant based on the model to provide control assistance for the plant.

2. The assistance method of claim 1, wherein the method comprises a step of:

assisting a design of the plant or the intermediate system based on the model.

3. The assistance method of claim 1, wherein the method comprises a step of:

assisting a control of the plant during operation based on the model.

4. The assistance method of claim 3, wherein the step of assisting includes a step of:

predicting a state quantity representing a state of the plant based on the model.

5. The assistance method of claim 3, wherein the step of assisting includes a step of:

calculating a control parameter for controlling the plant based on the model.

6. The assistance method of claim 1, wherein the reduced system is a laboratory-scale system, and the intermediate system is a bench-scale system or a pilot-scale system.

7. The assistance method of claim 1, wherein the process is a chemical process, the process performed in the reduced system includes a batch process, and the process performed in the plant includes a continuous process.

8. The assistance method of claim 7, wherein the model predicts a reaction rate coefficient of a reaction included in the process.

9. An assistance device, comprising:

a processor, wherein the processor acquires information related to a process or a reduced system when the process to be performed in a plant is performed in the reduced system with a smaller scale than the plant, the processor automatically generates a model for predicting a process to be performed in the plant, or an intermediate system with a scale between the plant and the reduced system, based on a relationship between systems when the process is performed in a plurality of systems of different scales, from the information using an AI (artificial intelligence), wherein the AI is configured to learn a relationship between systems based on (i) information related to a plurality of systems of different scales, (ii) information of a process when the process is performed in the reduced system or information of the model for predicting a process to be performed in the reduced system, and (iii) information of the model for predicting the process to be performed in the plant or the intermediate system, and the processor determines an operation condition of the plant based on the model to provide control assistance for the plant.

10. A non-transitory computer-readable storage medium storing an assistance program that makes a computer function as an information acquisition unit, a model generation unit and an operation condition determination unit, wherein the information acquisition unit acquires information related to a process or a reduced system when the process to be performed in a plant is performed in the reduced system with a smaller scale than the plant, the model generation unit automatically generates a model for predicting a process to be performed in the plant, or an intermediate system with a scale between the plant and the reduced system, based on a relationship between systems when the process is performed in a plurality of systems of different scales, from the information using an AI (artificial intelligence), wherein the AI is configured to learn a relationship between systems based on (i) information related to a plurality of systems of different scales, (ii) information of a process when the process is performed in the reduced system or information of the model for predicting a process to be performed in the reduced system, and (iii) information of the model for predicting the process to be performed in the plant or the intermediate system, and the operation condition determination unit determines an operation condition of the plant based on the model to provide control assistance for the plant.

* * * * *